US012123991B2

(12) United States Patent
Tarifeño-Saldivia et al.

(10) Patent No.: US 12,123,991 B2
(45) Date of Patent: Oct. 22, 2024

(54) NEUTRON DOSIMETER

(71) Applicant: UNIVERSITAT POLITECNICA DE CATALUNYA, Barcelona (ES)

(72) Inventors: Ariel Tarifeño-Saldivia, Barcelona (ES); Francisco Calviño Tavares, Terrassa (ES)

(*) Notice: Subject to any disclaimer, the term of this patent is extended or adjusted under 35 U.S.C. 154(b) by 0 days.

(21) Appl. No.: 17/796,398

(22) PCT Filed: Jan. 29, 2021

(86) PCT No.: PCT/EP2021/052074
§ 371 (c)(1),
(2) Date: Jul. 29, 2022

(87) PCT Pub. No.: WO2021/152069
PCT Pub. Date: Aug. 5, 2021

(65) Prior Publication Data
US 2023/0341572 A1  Oct. 26, 2023

(30) Foreign Application Priority Data
Jan. 29, 2020 (EP) ..................... 20382052

(51) Int. Cl.
G01T 3/00 (2006.01)
(52) U.S. Cl.
CPC .................... G01T 3/008 (2013.01)
(58) Field of Classification Search
CPC .. G01T 7/00; G01T 3/008; G01T 3/06; G01T 3/00
See application file for complete search history.

(56) References Cited

U.S. PATENT DOCUMENTS 5,578,830 A   11/1996  Olsher et al.
6,930,311 B1  8/2005   Riel
(Continued)

FOREIGN PATENT DOCUMENTS

CN        102928867 A     2/2013
WO    WO2009063078 A2    5/2009
WO    WO2010040330 A2    4/2010

OTHER PUBLICATIONS

ICRP 1996, Conversion Coefficients for use in Radiological Protection against External Radiation, ICRP Publication 74. Ann. ICRP 26 (3-4).
(Continued)

Primary Examiner — Courtney D Thomas
(74) Attorney, Agent, or Firm — Eugenio J. Torres-Oyola; Victor M M. Rodriguez-Reyes; Rafael Rodriguez-Muriel

(57) ABSTRACT

A lightweight neutron dosimeter is disclosed. The dosimeter comprises a cylindrical body acting as moderator, an active component acting as neutron detector and neutron filters. The neutron filters are formed by at least two crowns placed inside the moderator, a first of said crowns being placed adjacent to the active component and a second crown being placed between the first crown and an inner wall surface of the moderator. The first crown includes top and bottom caps to cover open ends of the first crown, the top cap having an opening to allow introduction of the active component therein and a thickness of the top and bottom caps being the same as the thickness of the two crowns. The first and second crowns comprises vertical ribbons, an area covered by the plurality of vertical ribbons in each crown, excluding the top and bottom caps, being comprised in a range between 50-95%.

15 Claims, 5 Drawing Sheets

(56) References Cited

U.S. PATENT DOCUMENTS

| | | |
|---|---|---|
| 7,655,921 B2 | 2/2010 | Fehrenbacher et al. |
| 10,281,600 B2 | 5/2019 | Degtiarenko |
| 2018/0299570 A1* | 10/2018 | Degtiarenko ............. G01T 3/00 |

OTHER PUBLICATIONS

International Electrotechnical Commission (IEC) 2014, Radiation protection instrumentation Neutron ambient dose equivalent (rate) meters, IEC Report.

American National Standards Institute (ANSI) 2003, American national standard for performance specifications for health physics instrumentation-portable instrumentation for use in normal environmental conditions, ANSI Report.

Andersson, I. Oe., & Braun, J. (1964), A Neutron Rem Counter (AE—132), Sweden.

J.W. Leake, An improved spherical dose equivalent neutron detector, Nuclear Instruments and Methods 63:3 (1968) 329-332.

Hankins, D. E., A Neutron Monitoring Instrument Having a Response Approximately Proportional to the Dose Rate from Thermal to 7.0 MEV, Health physics. 14(5) (1968) 518-20.

C. Birattari, A. Ferrari, C. Nuccetelli, M. Pelliccioni, M. Silari, An extended range neutron rem counter, NIMA 297 (1990) 250-257.

T. Nunomiya et al. Journal of Nuclear Science and Technology, Development of lightweight portable neutron survey meter, 54:11 (2017) 1215-1222.

M. Caresana et al., Intercomparison of radiation protection instrumentation in a pulsed neutron field, NIMA 737 (2014) 203-213.

1. Rios, J. Gonzalez, R.E. Mayer, Total fluence influence on the detected magnitude of neutron burst using proportional detectorsRadiation Measurements, 53-54 (2013) 31.

C. Cassell et al., A novel technique for compensation of space charge effects in the LUPIN-II detector, NIMA 804 (2015) 113-117.

R. H. Olsher et al., An Improved Neutron REM Meter, Health Phys. 79:2 (2000) 170-81.

T Otto et al., The ICRU Proposal for New Operational Quantities for External Radiation, Radiation Protection Dosimetry 180 (2018) 10-16.

J S Eakins et al., The effects of a revised operational dose quantity on the response characteristics of neutron survey instrument, J. Radial. Prot. 38 (2018) 688.

H. Schuhmacher et al, Evaluation of individual dosimetry in mixed neutron and photon radiation fields, PTB-N-49 report, 2006.

M. Caresana et al., Intercomparison of radiation protection instrumentation in a pulsed neutron field, Nuclear Instruments and Methods in Physics Research A 737 (2014) 203-213.

A. Tarifeno-Saldivia et al., Calibration methodology for proportional counters applied to yield measurements of a neutron burst, Review of Scientific Instruments 85, 013502 (2014).

\* cited by examiner

NEUTRON DOSIMETER

TECHNICAL FIELD

The present invention relates to radiation monitoring devices. In particular, the present invention relates to a neutron dosimeter able to work in continuous, quasi-continuous and pulsed neutron fields and that can detect neutron radiation in the energy range from 10E-9 (thermal) up to 10 MeV or 20 MeV. Particularly, the dosimeter is a lightweight neutron dosimeter. The dosimeter can be used in industrial, medical and research facilities, among others.

BACKGROUND OF THE INVENTION

Neutrons are produced as a primary or secondary radiation in nuclear reactors, accelerator based facilities, fusion plasmas and radioactive sources. Due to their high relative biological effectiveness, depending on the energy, neutrons could dominate the total radiation dose received by workers, patients and public in different facilities. Thus, in order to assess the potential risk and determine radioprotection measures inside exposed places, detection techniques providing a proper energy and time structure sensitivities of the neutron radiation are required.

The International Commission on Radiological Protection (ICRP) has recommended to use the ambient dose equivalent (H*(10)) as the operational quantity for area monitoring. Conversion factors from fluence to ambient dose equivalent have been compiled and published for different radiation types, including neutrons, in ICRP publication 74 [1].

An ambient neutron dosimeter is a detector able to provide a reading proportional to the neutron fluence. In order to provide a direct conversion from fluence to H*(10), the neutron energy response of an ideal dosimeter should mimic the shape of the conversion factors curve as a function of neutron energy. In practice, most ambient dosimeters present dosimetric responses which fit the ambient dose equivalent with underestimation and overestimation in different energy regions. The international organizations for standards, such as IEC or ANSI, recommends tolerance limits by energy response which lie typically from 50% to 200% of the ICRP recommendation in different energy regions [2, 3]. Most neutron dosimeters are currently specified with sensitivities from thermal energies up to 20 MeV. Version with extended energy sensitivity should be specified up to, at least, 200 MeV which is the current ICRP 74 recommendation.

The first designs of ambient neutron dosimeters date from the sixties. These designs consist of a thermal neutron counter surrounded by a moderator material, made typically of high density polyethylene. A single layer of neutron absorbing material is also used to compensate the typical overestimation at thermal energies. The moderator geometry used by these designs are: (a) a 21.6 cm diameter/24.4 cm long cylindrical moderator with a cylindrical neutron counter (Anderson-Brown type [4]), (b) a 20.8 cm diameter spherical moderator with a spherical neutron counter (Leake type [5]), and (c) a 22.9 cm diameter spherical moderator with a cylindrical neutron counter (Hankins type [6]). Extended energy dosimeters use neutron multiplication reactions, such as (n,2n') and (n,3n'), on a single layer of high Z material in order to increase the detector sensitivity beyond the evaporation peak (~10-20 MeV) [7]. These classical designs have been adopted by manufacturers with small variations over the time.

Portability is one of the drawbacks of most of the prior art ambient neutron dosimeters. With exception of the Leake type (~5 kg), most dosimeter have a weight around 9 kg or higher, which clearly impose serious restrictions for transport, manipulation and operation as a hand held device. The portability limitation has been addressed by the novel NSN3 detector [8], which is based on nuclear reactions on a specific mixture of gas instead of moderation and thermal neutron counting. The final detector is just 2.2 kg, but presents a poor dosimetric response for epithermal and thermal neutron energies. Currently, there is no solution for a dosimeter less than 4 kg performing well in a wide neutron energy range (from thermal to the evaporation peak).

Likewise, the performance in pulsed neutron fields is also drawback of the prior art ambient neutron dosimeters. Typically, a pulsed neutron field is created by a radiation burst with a time duration spanning from few ns up to about 1 ms. An intercomparison exercise in pulsed neutron fields [9] has shown that most active commercial neutron dosimeters suffer from severe underestimations at around 10 nSv/burst or higher. The problems are related to the strong instantaneous event pile-up inside the proportional neutron counter, which makes impossible counting single events and impair the counter proportionality due to spatial charge accumulation effects [10]. The shortage of pulsed neutron dosimeters is a major issue indeed for radiation protection since there is an increasing number of pulsed facilities, such as spallation sources, high power laser or fusion plasmas. Moreover, pulsed neutron fields are normally created as a result of beam losses in accelerator based facilities for research and medical applications.

A solution for neutron dosimetry in pulsed fields has been proposed in the International patent application WO-A2-2010040330 [11]. The dosimeter claimed in this invention is based on the silver activation technique, thus providing a reliable estimation of the dose for single neutron burst. The main drawback of this invention is the reaction time, which is typically tens of seconds according to the half-life times of the activated silver isotopes.

The LUPIN detector is another proposed solution for pulsed neutron dosimetry. The detector concept is based on the use of an innovative read-out, which includes correction factors, and to mitigate the spatial charge accumulation effects by using a long proportional neutron counter [12]. The resulting detector exhibit real-time monitoring capabilities with a good performance up to around 500 nSv/burst, without applying correction algorithms, but with a mass of 18 kg which limits device portability.

In addition, the energy sensitivity is most likely the main issue in prior art ambient neutron dosimeters. Modern facilities for research or medical application use particle accelerator of extreme energies. For instance, particle therapy facilities use proton beams up to 250 MeV and heavy ion beams up to several GeV, respectively. At these energy ranges, several reaction channels are open when the beam interacts with the gantry materials or the patient itself. Consequently, complex stray secondary neutron fields are created with contributions from thermal up to the beam energy. For proton therapy, the only dosimeter providing reliable readings of in close-to-clinical conditions of secondary neutrons is the WENDI-II device (U.S. Pat. No. 5,578,830A [13], [14]). This detector is based on the Anderson-Brown design and includes a single Tungsten layer for neutron multiplication. Despite the good energy sensitivity performance, the response of this dosimeter to quasi-continuous or pulsed neutron fields is rather poor.

According to The International Commission on Radiation Units and Measurements (ICRU) the current recommendations on operational quantities for radiation protection present several conceptual and technical shortcomings. This has motivated ICRU to propose a new set of operational quantities, related directly to the effective dose and absorbed dose, for an extended range of particles and energy ranges up to 200 GeV [15]. In the case of neutrons, the ICRU proposal has a significant impact, compared to ICRP74, for energies less than 1 keV and higher than 20 MeV, respectively. While for the lower energy ranges ICRP74 is too much conservative, for the high energy regions the current recommendation is too underestimated. A recent study has concluded that re-optimization of non-extended dosimeter designs would be needed in order to match better the requirements of the new proposal of operational quantity [16].

A dosimeter trying to overcome the above-mentioned energy sensitivity drawback is known by document U.S. Pat. No. 7,655,921-B2 [17], which discloses a dosimeter for the detection of neutron radiation within an energy range of 0.025 eV to several hundred GeV, comprising a substantially spherical base body which is used as a moderation body and which comprises hydrogenous material, a detection element which is arranged in the center of the base body, and a neutron converter surrounding the detection element. The neutron converter comprises metal atoms which convert the energy of the high-energy neutron radiation essentially into neutrons within a suitable energy range. The base body is provided with an access through which the detection element can be introduced into the neutron converter and removed therefrom. The neutron converter is embodied in the form of a cylinder.

Likewise, document WO 2009063078-A2 [18] provides an instrument for detecting radiation, which comprises an inner core housing a neutron detector, and an outer core comprising a neutron-moderating material, the instrument further including at least one elongate thermal neutron guide located within the outer core and having an inner end that terminates proximal to the neutron detector. In use, the elongate thermal neutron guide channels thermal neutrons towards the neutron detector. The instrument is lightweight and is intended to reduce overestimates of low energy neutrons (0.4 eV to 100 keV), which are characteristic of other devices.

Other instruments for detecting radiation are provided/disclosed by U.S. Pat. No. 6,930,311-B1 [19], U.S. Ser. No. 10/281,600-B2 [20] and CN102928867-A [21].

DESCRIPTION OF THE INVENTION

Embodiments of the present invention provide a neutron dosimeter suited for both continuous and pulsed fields. The neutron dosimeter comprises, as known in the field: a cylindrical body made of a polyethylene material acting as moderator; an active component acting as neutron detector and located in the center of the cylindrical body; and neutron filters to compensate an over sensitivity of the neutron detector in a given energy region.

The neutron filters are formed by two (it could be more than two) crowns, which are made of a material with a given thickness, and top and bottom caps. The two crowns are placed inside the polyethylene moderator, where a first of said two crowns is placed adjacent to the active component and a second of said two crowns is placed between the first crown and an inner wall surface of the polyethylene moderator.

The top and bottom caps are configured/arranged to cover (at least) the open ends of the first crown. The top cap has an opening to allow introduction of the active component therein. The thickness of the material of the top and bottom caps is the same as the thickness of the material used for the two crowns. In addition, the first and second crowns each comprises a plurality of vertical ribbons, an area covered by the plurality of vertical ribbons in each crown, excluding the top and bottom caps, being comprised in a range between 50-95%.

The neutron dosimeter also has a removable element placed between the first crown and the active component to improve the performance of the neutron detector to intense neutron radiation fields, in pulsed or continuous form. Particularly, the removable element includes a hollow cylinder with inner diameter between 1.05 and 1.2 times an outer diameter of the active component.

The neutron dosimeter can be detachably attached to the cylindrical body by means of pressure. To that end, the neutron dosimeter can include a toric joint, or O-ring, with the cylindrical body including a corresponding groove for the toric joint be seated in and compressed during assembly of the two elements. Alternatively, the attachment/fixation of the neutron dosimeter to the cylindrical body can be made using screws or fasteners. Even, in another embodiment, the neutron dosimeter can be provided with a thread to be secured to the cylindrical body.

In an embodiment, the two crowns are made of a cadmium material. In this case the given thickness is comprised in a range between 0.5 and 1 mm. In another embodiment, the two crowns are made of a borated silicone material. In this case the given thickness is comprised in a range between 3 and 5 mm.

In an embodiment, the inner radius of the first crown is comprised in a range between 2.0 and 3.0 cm and the inner radius of the second crown is 0.5 to 1.75 cm larger than the inner radius of the first crown. Alternatively or complementary, the height of the neutron filters can be comprised in a range between 50 and 100 mm.

The hollow cylinder can be made of a polyethylene material and a neutron absorbing material such as cadmium, cadmium mixed with boron, polyethylene, polyethylene mixed with boron, or lithium, among others. The neutron absorbing material particularly comprises a plurality of ribbons (or strips), of any shape, for example vertical, radial, helicoidal, etc. The neutron absorbing material can cover at least part of the surface of a sensitive volume of the active component. In any case, it should be noted that the neutron absorbing material can cover the full surface of the sensitive volume and even exceed this surface. Alternatively, the hollow cylinder can be made of a borated-polyethylene material, the latter being comprised in a fraction from 0.5 to 30% by weight.

In an embodiment, the neutron dosimeter also includes a gamma filter made of a solid lead metal cylinder with an inner radius comprised in a ranged between 7 and 16 mm, and a thickness between 1 and 3 mm.

In an embodiment, in particular to provide a lightweight neutron dosimeter of less than 5 kilograms, the cylindrical body comprises an external radius Rm comprised in a range between 7 and 10 cm. The total height of the cylindrical body, namely Lm, can be computed using the following empirical equation: Lm (Rm, RA)=$1.904 \cdot Rm + 53.965 \cdot RA^2 - 138.65 \cdot RA + 83.818$ [cm], where Rm is given in cm, and RA is the nominal anisotropy factor and is defined as the ratio between a weighted neutron response of the neutron detector, for omnidirectional fast neutron fields, and the nominal response to lateral irradiation of the cylinder including the active component.

In addition, the neutron dosimeter can also include a metallic beryllium or beryllium oxide element placed between the second crown and the moderator. The metallic beryllium or beryllium oxide element can be a hollow shaped cylinder or a third crown made of a plurality of vertical ribbons or rods in a coaxial geometry.

Particularly, the active component comprises a mixture of $^3$He and a quenching gas in a proportion up to 3% by mass. Likewise, the polyethylene material is a high density polyethylene material with a density comprised in a range between 0.90-0.98 g/cm$^3$.

In yet another embodiment, the active component is configured to communicate with an electronic processing module to transmit the charge produced in the active component due to the detection of single or multiple neutron events. The electronic processing module can be externally mounted on the cylindrical body or can be positioned remote to the cylindrical body.

Hence present invention provides a modern radiation sensor able to overcome the limitations of present market solutions in ambient dosimetry of continuous and pulsed neutron fields. Particularly, the neutron dosimeter: i) comprises a cylindrical body detector; ii) a removable element compatible with the cylindrical body that allows scaling the detection sensitivity without significantly altering the energy response; and iii) is lightweight (less than 5 kg).

The dosimeter can be used in nuclear reactors; radioactive sources; neutrons produced by D-D nuclear fusion; proton therapy facilities, etc.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

Present invention provides a cylindrical neutron dosimeter 1, particularly of the Anderson-Brown type, able to work in continuous, quasi-continuous and pulsed neutron fields. The dosimeter can be used with an electronic processing module such as a charge sensitive preamplifier and readout based either on analog or digital electronics. In some embodiments, the neutron dosimeter 1 has a maximum weight that is less than 5 kilograms (excluding electronics), i.e. the dosimeter is lightweight.

The energy sensitivity of the neutron dosimeter 1 is according to recommendations ICRP74 or ICRU-RC26. Likewise, the neutron detector is designed for operational energies from 10E-9 (thermal) up to 10 MeV or 20 MeV (the later when using neutron multipliers). Deviation from the average detection sensitivity is less than 20% from the nominal sensitivity for omnidirectional fast neutron fields or workplace fields.

Figure 1:
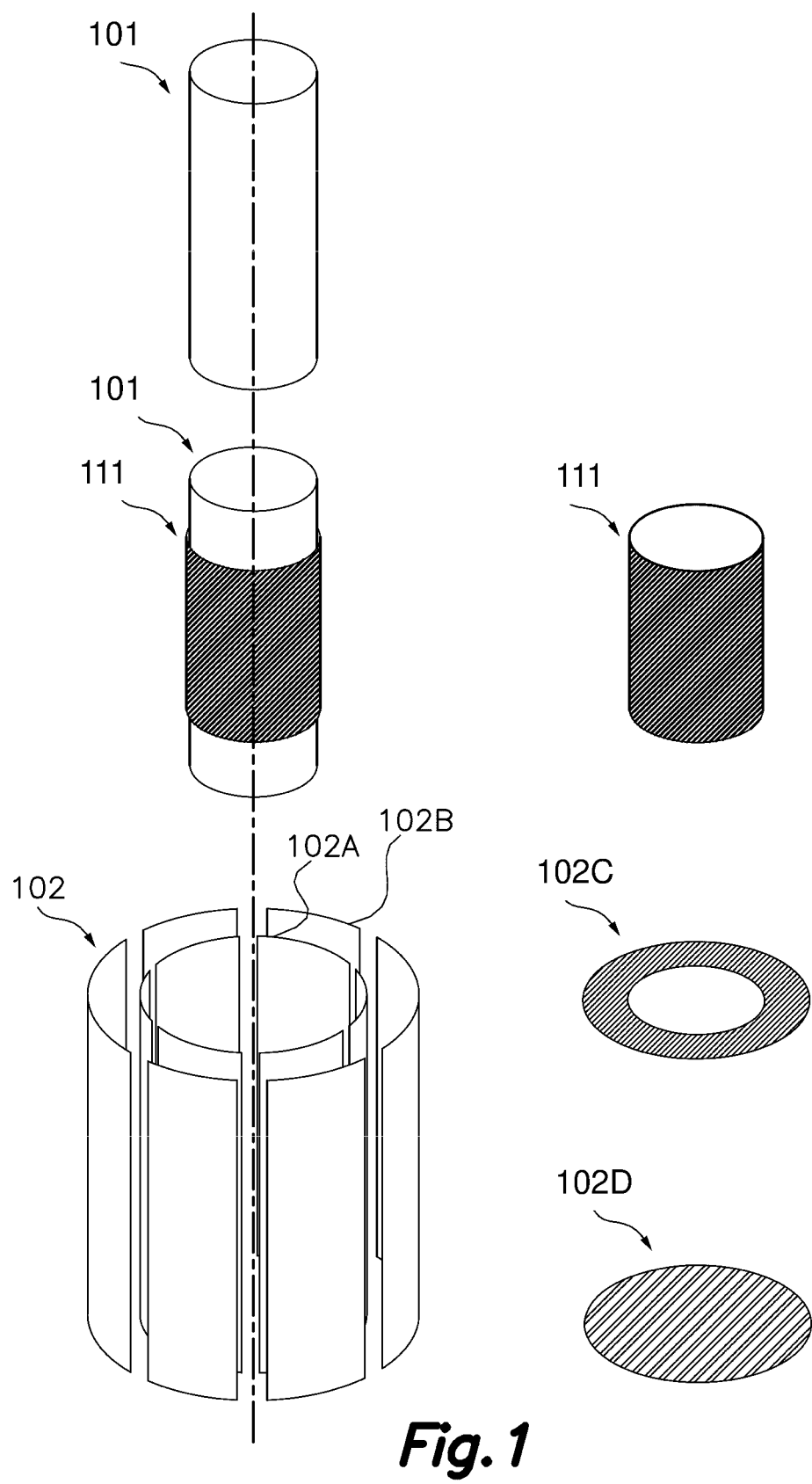
FIG. 1 schematically illustrates the proposed neutron dosimeter, according to an embodiment of the present invention.
Figure 2A:
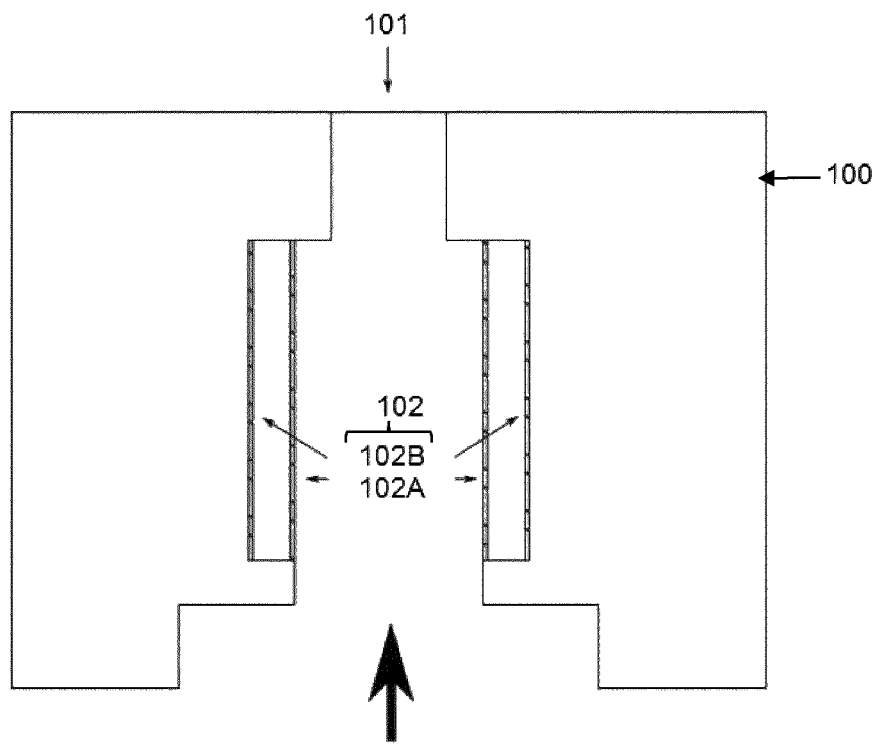
FIG. 2 schematically illustrates another embodiment of the proposed neutron dosimeter, in this case including the efficiency plug, or removable element.
Figure 2B:
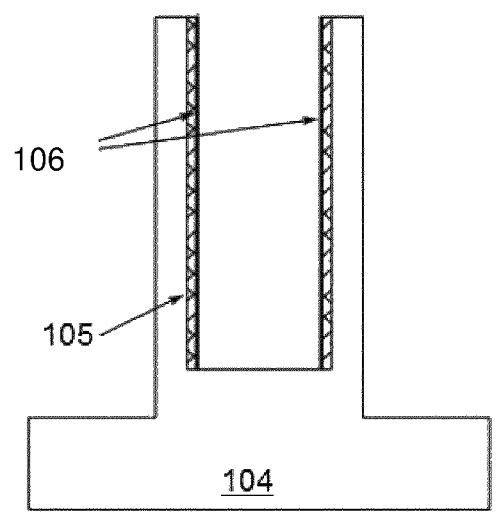

FIGS. 1 and 2A and 2B illustrate different embodiments of the proposed neutron dosimeter 1. The neutron dosimeter 1 comprises a cylindrical body 100 (or passive component) acting as moderator, an active component 101 acting as neutron detector, and neutron filters 102 to compensate an over sensitivity of the neutron detector in the thermal and epithermal energy regions.

In an embodiment, the cylindrical body 100 is made of a high density polyethylene material (density 0.90-0.98 g/cm$^3$). The external radius (Rm) of the cylindrical body 100 can go from 7 cm up to 9.5 or 10.0 cm. The total height (Lm) of the cylindrical body 100 can be computed using the following equation:

$$Lm(Rm,RA)=1.904 \cdot Rm+53.965 \cdot RA^2-138.65 \cdot RA+83.818 \text{ [cm]}, \quad \text{(Eq. 1)}$$

where Rm is given in cm and RA is the nominal anisotropy factor. RA is defined as the ratio between the weighted neutron response of the neutron detector, for omnidirectional fast neutron fields, and the nominal response to lateral irradiation of the cylinder including the active component 101. The aspect ratio (Lm/Rm) of the moderator 100 goes from 1.2 to 1.8. Likewise, particularly, the RA can go from 0.8 to 1.3.

It should be noted that in other embodiments, not restricted to a mass of less than 5 kilograms, the external radius (Rm) of the cylindrical body could go up to 16.0 cm.

The active component 101 comprises a sensitive volume, or active length, 111. The active component 101 is filled with a mixture of $^3$He gas and a quenching gas (up to 3% fraction by mass). The outer diameter of the active component 101 can be comprised in a range between 0.5 and 1.0 inches and the sensitive volume 111 can be comprised in a range between 30 and 70 mm, particularly 50 mm.

The neutron filters 102 can be made of cadmium foils with a thickness from 0.5 to 1 mm or can be made of a borated silicone material with a thickness between 3 and 5 mm.

The neutron filters 102 are placed inside the cylindrical body 100 shaped as two crowns 102A, 102B and top and bottom caps 102C, 102D. The first crown 102A is placed adjacent to the active component 101 and the second crown 102B is placed between the first crown 102A and the inner wall surface of the cylindrical body 100. The top and bottom caps 102C, 102D are included to cover open ends of the first crown 102A. The top cap 102C has an opening to allow introduction of the active component 101 therein. The material thickness of the top and bottom caps 102C, 102D is about 0.5 mm, which is the same as the material thickness of the two crowns 102A, 102B.

The first and second crowns 102A, 102B (although not illustrated in the figure) are made of a discrete number of vertical ribbons. The area covered by the vertical ribbons in each crown, excluding the top and bottom caps 102C, 102D, is between 50-95%. According to a particular embodiment, the first crown 102A can be made of 6 vertical ribbons and the second crown 102B can be made of 8 vertical ribbons. The height of the two crowns 102A, 102B can be between 50 and 100 mm.

Alternatively, in another embodiment, not illustrated, the neutron filters 102 are placed inside the cylindrical body 100 as a hollow coaxial cylinder. In this case in which one single filter is used, the inner radius can be 2.5 to 5 cm.

The neutron dosimeter 1 can also incorporate a gamma filter to reduce the sensitivity of the active component 101 to X-rays. Particularly, the gamma filter is made of a solid lead metal cylinder. The inner radius of said metal cylinder can vary from 7 to 16 mm, and its thickness can be between 1 and 3 mm.

Moreover, metallic beryllium or beryllium oxides elements acting as neutron multipliers can be also used to compensate the under sensitivity of the neutron detector to energies higher than 10 MeV. Particularly, the metallic beryllium or beryllium oxides elements are placed between the second crown 102B and the cylindrical body 100 and can be either in the form of a hollow shaped cylinder or in the form of a third crown made of a plurality of vertical ribbons or rods in a coaxial geometry. The inner radius of the cylinder or of the crown can be between 4 and 7 cm. When using vertical ribbons, the thickness of the material is from 3 to 12 mm. When using rods, the rod diameter goes from 4 to 10 mm. When using the crown, the sum angles subtended by all ribbons, or rods, goes from 72° up to 165°.

In the embodiment of FIGS. 2A and 2B, the neutron dosimeter 1 besides the elements previously described also includes a removable plug (or element) 104 inserted into the cylindrical body 100 to compensate the under sensitivity of the neutron detector to energies higher than 10 MeV (the arrow at the bottom part of FIG. 2A indicates the insertion direction of the removable element 104 into the passive component 100). The removable element 104 includes a hollow cylinder with inner diameter between 1.05 and 1.2 times the outer diameter of the active component 101.

The hollow cylinder can be made of a polyethylene material (e.g. a high density polyethylene material) and a neutron absorbing material 106 with a plurality of ribbons/strips. The neutron absorbing material 106 can be made of different material such as lithium, cadmium, polyethylene, borated polyethylene, etc. The neutron absorbing material 106 can cover the sensitive volume 111 of the active component 101. Particularly, the fraction of the $^3$He-filled tube area, excluding top and bottom ends, covered by the neutron absorbing material 106 in the hollow cylinder is from 20% to 95%. Alternatively, the hollow cylinder can be made of a borated-polyethylene material, the latter being comprised in a fraction from 0.5 to 30% by weight. The gamma filter 105 is included as a part of the removable plug 104. In this case the gamma filter 105 has thickness between 1 and 3 mm.

Figure 3:
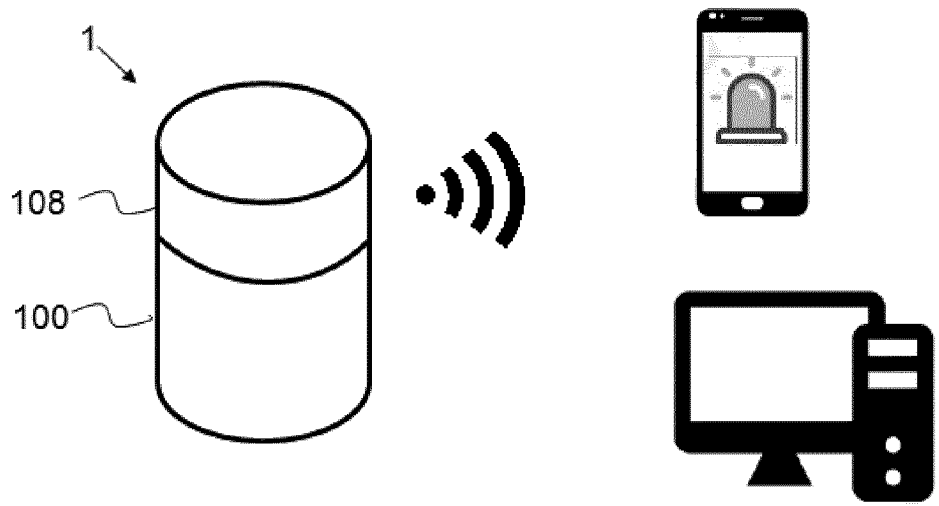
FIG. 3 schematically illustrates another embodiment of the proposed neutron dosimeter, in this case including the power and electronic processing module.

FIG. 3 illustrates an embodiment in which the neutron dosimeter 1 also includes an electronic processing module 108 mounted on top of the cylindrical body 100. The electronic processing module 108 is operatively connected to communicate with the active component 101 and to transmit the readouts to different computing devices such as Smartphones, computers, servers, etc. The electronic chain includes a high and low voltage DC power supply. The signal processing and readout can be based either on analog and/or digital electronics. In the case of measuring continuous or quasi-continuous neutron fields, the neutron dosimeter 1 is to be operated by detecting single events (pulse mode) and using a rate meter, or equivalent electronics, able to provide the dose rate in the proper units. In the case of pulsed neutron fields, the neutron dosimeter 1 is to be operated in charge integration mode including electronics able to determine the total charge deposited inside the active component 101 by detected events from the neutron burst, and providing the integrated dose by neutron burst (pulsed dose rate).

It should be noted that in other embodiments, not illustrated, the electronic processing module can be located remote to the cylindrical body 100.

Following different particular examples of the proposed neutron dosimeter 1 are detailed.

Example 1

According to this example, the neutron dosimeter is lightweight with a total mass less than 5 kg and specified energy range from thermal up to 10 MeV. The active component 101 is a $^3$He-filled cylindrical neutron counter, 10 atm nominal pressure, 1 inch external diameter, 74.6 mm total tube length and 50 mm nominal length of the detecting volume. The cylindrical body 100 is made of high density polyethylene material with a nominal density of 0.95 gr/cm$^3$. The nominal anisotropy factor is chosen to be RA=1.1. The external radius of the moderator is selected to Rm=9 cm. Therefore, the length of the moderator is 13.7 cm. The neutron filters 102 are made by natural cadmium material with a thickness of 0.5 mm. The first crown 102A is formed by six vertical ribbons of 75 mm length, including top and bottom caps, and inner radius of 2.25 cm. The arc subtended by each ribbon in the first crown 102A is 51 degrees. The second crown 102B is made by eight vertical ribbons, at an inner radius of 3.25 cm, each one subtending an arc of 36 degrees. The active component 101 and neutron filters 102 are placed symmetrically with respect to the radial and axial axis of the cylindrical body 100. The total mass of device is 3.5 kg including elements 100 to 102.

Figure 4:
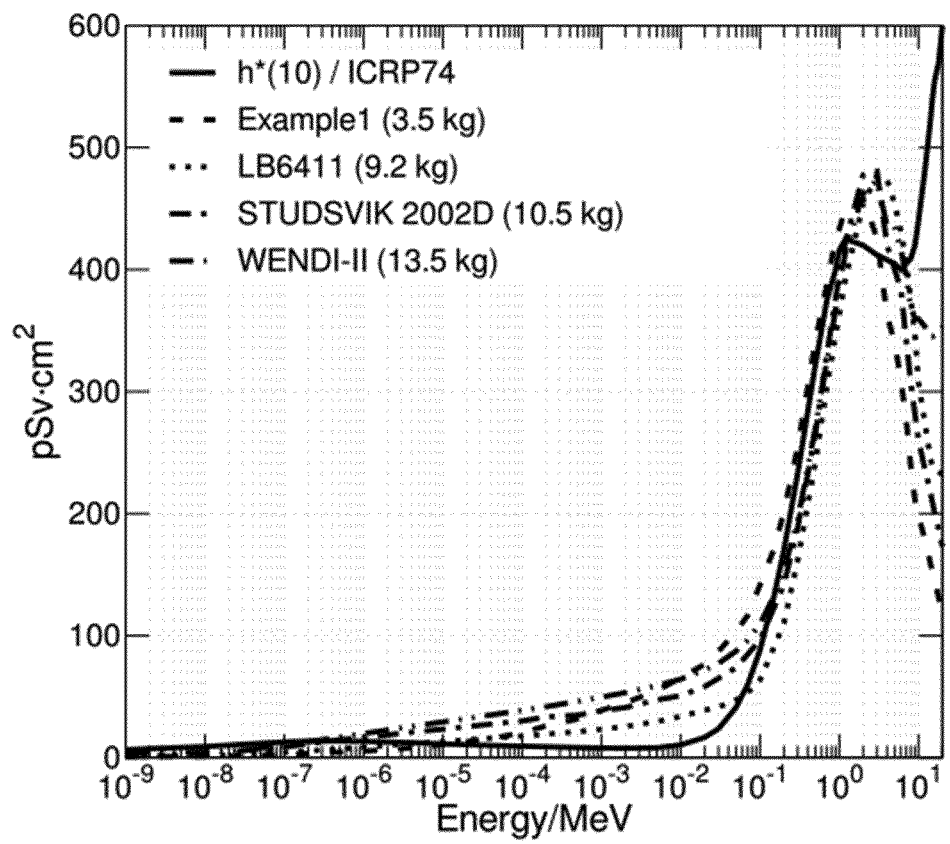
FIG. 4 illustrates the dosimetric response obtained with example 1.

The response of this example has been calculated by Monte Carlo simulations using the GEANT4 toolkit (https://geant4.web.cern.ch/). The dose response is calibrated for the reference spectrum from a $^{252}$Cf neutron source. The dosimetric response is presented in FIG. 4 and compared with similar calculations for extended and non-extended energy range commercial dosimeters. The energy response provided by the lightweight dosimeter 1 of the present example shows a satisfactory performance and similar to commercial devices.

Figure 6:
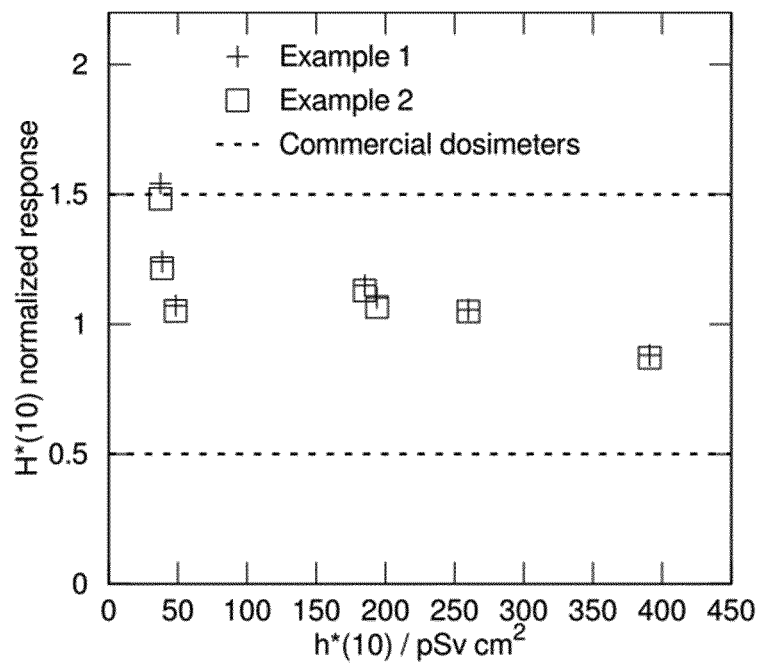
FIG. 6 illustrates the performance for workplaces. Upper and lower limits in commercial dosimeters as reported by the EVIDOS project [22].

The performance for the neutron spectra in different workplaces including nuclear reactors, transport casks, fuel processing nuclear facilities and fast neutron sources has been also studied. Reference data has been provided in Table 1 as reported by the EVIDOS project [22] and the ISO recommendation 8529-2001. Calculations for the present example are shown in FIG. 6 and compared with typical values. The lightweight neutron dosimeter 1 provides a similar performance in workplaces as heavier commercial devices.

TABLE 1

Reference neutron spectra for workplaces including nuclear reactors, transport casks, fuel processing nuclear facilities and fast neutron sources.

| Spectrum | Average E/MeV | h*(10)/pSv · cm² |
|---|---|---|
| BWR SAR - control rod room/EVIDOS | 0.03990 | 37.4 |
| CASK TN N - centre of end plate/EVIDOS | 0.04049 | 38.6 |
| SCK•CEN VENUS F - side shielding/EVIDOS | 0.113 | 48.4 |
| CASK NTL M - centre of long side/EVIDOS | 0.313 | 185.1 |
| Nuclear facility 3 - inside room/EVIDOS | 0.639 | 192.9 |
| Belgonucléare 2A - unshielded rack/EVIDOS | 1.07 | 260 |
| 241AmBe/ISO8529-2000 | 4.16 | 391 |

Example 2

The lightweight neutron dosimeter according to example 1 has been modified with a removable element 104 in order to adapt the neutron sensitivity to very intense neutron fields. The removable element 104 used in this example is made of high density polyethylene material with a nominal density of 0.95 gr/cm³. The hollow cylinder has an inner diameter of 27.5 mm.

Figure 5:
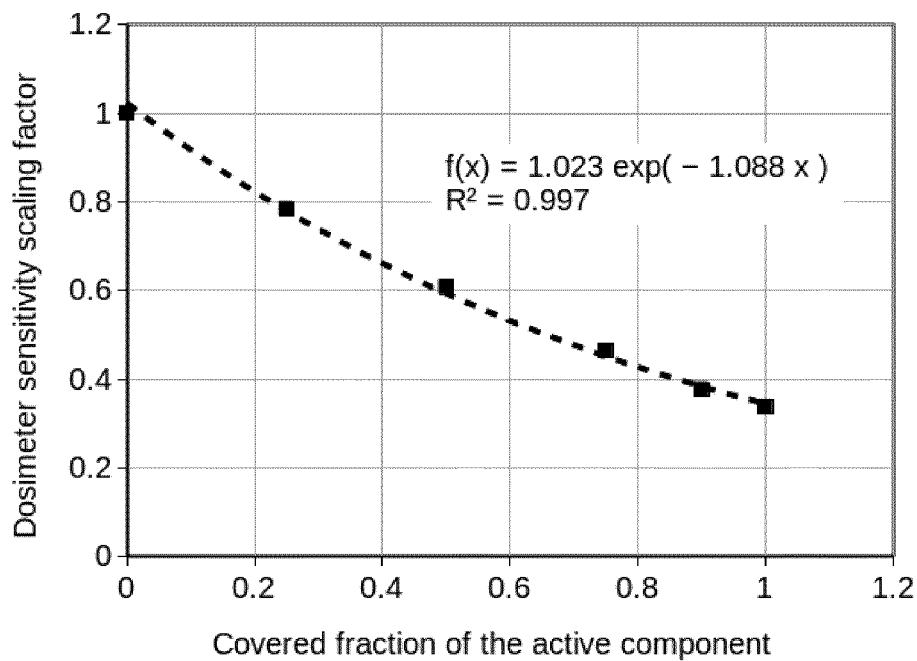
FIG. 5 illustrates the relationship between the covered fraction of the area of the active component and the scaling factor of the neutron sensitivity, for example 2.

The general relationship between the covered fraction of the area of the active component 101, in example 1, and the scaling factor of the neutron sensitivity is presented in FIG. 5. For the present example, the absorbing neutron material 106 is natural cadmium which is inserted inside the hollow cylinder, in form of vertical ribbons, covering 75% of the area of the active component 101. Thus, the dosimeter sensitivity is reduced by a factor 0.46. The impact of the present example in the total mass is less than 100 gr.

Calculations of the performance, for example 2, in different workplaces are shown in FIG. 6. These calculations demonstrate that the removable element 104 is able to effectively scale the neutron sensitivity without impairing significantly the overall energy response.

Example 3

The neutron dosimeters described in examples 1 and 2 are used in charge integration mode, with suitable electronic processing modules, in order to measure pulsed neutron fields. The intrinsic response of the active component 101, described in example 1, has been experimentally characterized in a pulsed field produced by a spallation neutron source. These data has been used for derivation of the dosimeter performance in pulsed neutron fields.

Figure 7:
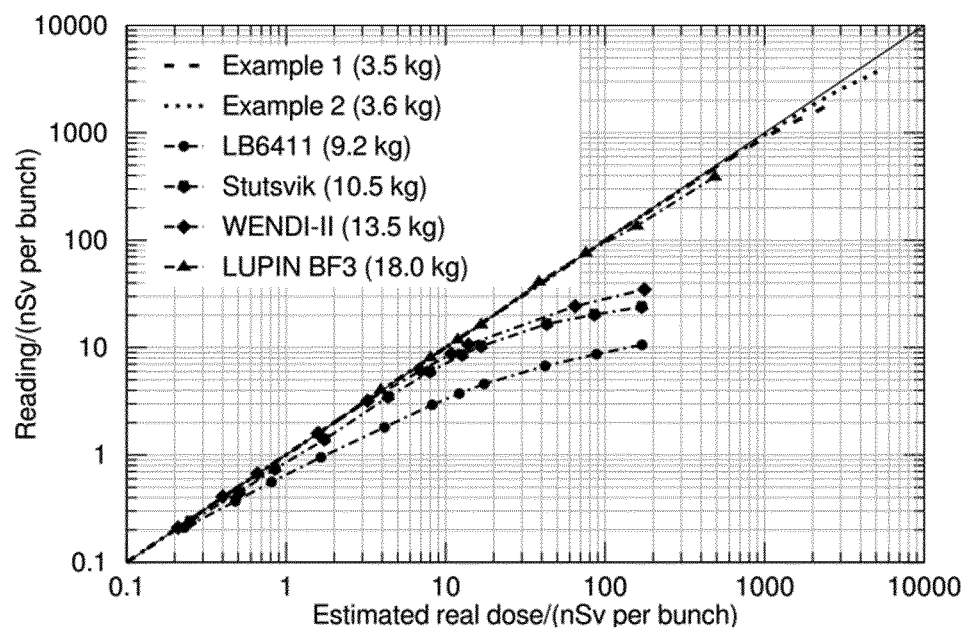
FIG. 7 illustrates the performance for pulsed radiation fields. Data for commercial dosimeters extracted from [24].

The performance for pulsed neutron fields, in examples 1 and 2, are presented in FIG. 7 and compared with reference data of commercial dosimeters [23]. The lightweight neutron dosimeter of this example 3 is capable to measure pulsed neutron doses higher than 1 uSv per bunch without being impaired by the strong event pile-up. Moreover, the use of the removable element 104 for device in example 2 provides an additional flexibility in order to increase the dynamic range by a factor of 2.

In other embodiments, in this case not illustrated, the proposed removable element or plug 104 can be also used in other detectors, based on neutron moderating bodies of any shape, for compensating the intrinsic over sensitivity of the active component, for reducing the pile-up or dead-time in the counting rate. In this case, a body (or other element) of the neutron-counting detector should have a compatible configuration with the removable element 104 in order the latter being secured/attached thereto.

The present disclosure and/or some other examples have been described in the above. According to descriptions above, various alterations may be achieved. The topic of the present disclosure may be achieved in various forms and embodiments. All applications, modifications and alterations required to be protected in the claims may be within the protection scope of the present disclosure.

The scope of the present invention is defined in the following set of claims.

REFERENCES

[1] ICRP, 1996. Conversion Coefficients for use in Radiological Protection against External Radiation. ICRP Publication 74. Ann. ICRP 26 (3-4).
[2] International Electrotechnical Commission (IEC) 2014 Radiation protection instrumentation Neutron ambient dose equivalent (rate) meters IEC Report.
[3] American National Standards Institute (ANSI) 2003 American national standard for performance specifications for health physics instrumentation—portable instrumentation for use in normal environmental conditions ANSI Report.
[4] Andersson, I. Oe., & Braun, J. (1964). A Neutron Rem Counter (AE—132). Sweden.
[5] J. W. Leake, Nuclear Instruments and Methods 63:3 (1968) 329-332.
[6] Hankins, D. E. Health physics. 14(5) (1968) 518-20.
[7] C. Birattari, A. Ferrari, C. Nuccetelli, M. Pelliccioni, M. Silari, NIMA 297 (1990) 250-257.
[8] T. Nunomiya et al. Journal of Nuclear Science and Technology, 54:11 (2017) 1215-1222.
[9] M. Caresana et al. NIMA 737 (2014) 203-213.
[10] I. Rios, J. Gonzalez, R. E. Mayer, Radiation Measurements 53-54 (2013) 31.
[11] "Neutron Dosimeter". 2008
[12] C. Cassell et al. NIMA 804 (2015) 113-117.
[13] "Neutron dose equivalent meter". 1995
[14] R. H. Olsher et al. Health Phys. 79:2 (2000) 170-81.
[15] T Otto et al. Radiation Protection Dosimetry 180 (2018) 10-16.
[16] J S Eakins et al. J. Radiol. Prot. 38 (2018) 688
[17] "Dosimeter for the detection of neutron radiation". 2004
[18] "Radiation Detection". 2007
[19] "Lightweight neutron remmeter". 2003
[20] "Neutron Detector and Dose Rate Meter using Beryllium-Loaded Materials". 2017
[21] "Compensation type neutron dose instrument". 2012
[22] H. Schuhmacher et al, "Evaluation of individual dosimetry in mixed neutron and photon radiation fields", PTB-N-49 report, 2006.
[23] M. Caresana et al., Nuclear Instruments and Methods in Physics Research A 737 (2014) 203-213.
[24] A. Tarifeno-Saldivia et al., Review of Scientific Instruments 85, 013502 (2014).

What is claimed is:

1. A neutron dosimeter, comprising:
a cylindrical body made of a polyethylene material acting as moderator;
an active component acting as neutron detector, the active component being located in the center of the cylindrical body; and
neutron filters configured to compensate an over sensitivity of the neutron detector in a given energy region, the neutron filters being formed by at least two crowns, which are made of a material with a given thickness, and top and bottom caps, the at least two crowns being placed inside the cylindrical body, a first of said two crowns being placed adjacent to the active component and a second of said two crowns being placed between the first crown and an inner wall surface of the cylindrical body, the top and bottom caps being configured to cover open ends of the first crown, the top cap having an opening to allow introduction of the active component therein;

wherein a thickness of a material of the top and bottom caps is the same as the thickness of the material of the two crowns;

wherein the first and second crowns each comprises a plurality of vertical ribbons, an area covered by the plurality of vertical ribbons in each crown, excluding the top and bottom caps, being comprised in a range between 50-95%; and wherein a removable element is placed between the first crown and the active component, said removable element being adapted to improve performance of the neutron detector to intense neutron radiation fields, in pulsed or continuous form, and said removable element including a hollow cylinder with inner diameter between 1.05 and 1.2 times an outer diameter of the active component.

2. The neutron dosimeter of claim 1, wherein the two crowns are made of a cadmium material, and wherein the given thickness is comprised in a range between 0.5 and 1 mm.

3. The neutron dosimeter of claim 1, wherein the two crowns are made of a borated silicone material, and wherein the given thickness is comprised in a range between 3 and 5 mm.

4. The neutron dosimeter of claim 1, wherein:
an inner radius of the first crown is comprised in a range between 2.0 and 3.0 cm and an inner radius of the second crown is 0.5 to 1.75 cm larger than the inner radius of the first crown; and/or
a height of the neutron filters is comprised in a range between 50 and 100 mm.

5. The neutron dosimeter of claim 1, wherein the hollow cylinder is made of a polyethylene material and a neutron absorbing material with a plurality of ribbons/strips, the neutron absorbing material covering at least part of a surface of a sensitive volume of the active component.

6. The neutron dosimeter of claim 1, wherein the hollow cylinder is made of a borated-polyethylene material, the latter being comprised in a fraction from 0.5 to 30% by weight.

7. The neutron dosimeter of claim 1, further comprising a gamma filter made of a solid lead metal cylinder with an inner radius comprised in a ranged between 7 to 16 mm, and a thickness between 1 and 3 mm.

8. The neutron dosimeter of claim 1, wherein the dosimeter is a lightweight dosimeter, wherein the cylindrical body comprises an external radius Rm comprised in a range between 7 and 10 cm and a total height Lm computed by means of:

$$Lm(Rm,RA)=1.904 \cdot Rm+53.965 \cdot RA^2-138.65 \cdot RA+83.818 \, [cm],$$

where:
Rm is given in cm;
RA is the nominal anisotropy factor and is defined as the ratio between a weighted neutron response of the neutron detector, for omnidirectional fast neutron fields, and the nominal response to lateral irradiation of the cylinder including the active component.

9. The neutron dosimeter of claim 8, further comprising a metallic beryllium or beryllium oxide element placed between the second crown and the cylindrical body.

10. The neutron dosimeter of claim 9, wherein the metallic beryllium or beryllium oxide element is a hollow shaped cylinder or a third crown made of a plurality of vertical ribbons or rods in a coaxial geometry.

11. The neutron dosimeter of claim 1, wherein the active component comprises a mixture of $^3$He and a quenching gas in a proportion up to 3% by mass.

12. The neutron dosimeter of claim 1, wherein the polyethylene material is a high density polyethylene material with a density comprised in a range between 0.90-0.98 g/cm$^3$.

13. The neutron dosimeter of claim 8, wherein a total dosimeter mass is less than 5 kilograms.

14. The neutron dosimeter of claim 1, wherein the active component is configured to communicate with an electronic processing module to transmit a charge produced in the active component due to the detection of single or multiple neutron events.

15. The neutron dosimeter of claim 14, wherein the electronic processing module is externally mounted on the cylindrical body or is positioned remote to the cylindrical body.

* * * * *